United States Patent
Collett, II

(10) Patent No.: US 7,219,863 B1
(45) Date of Patent: May 22, 2007

(54) WIRING CLIP SECURING ELECTRICAL WIRING TO A FRAMING MEMBER

(76) Inventor: Maury E. Collett, II, 4151 NE. 22nd Ct., Ocala, FL (US) 34479

( * ) Notice: Subject to any disclaimer, the term of this patent is extended or adjusted under 35 U.S.C. 154(b) by 0 days.

(21) Appl. No.: 09/629,241

(22) Filed: Jul. 31, 2000

(51) Int. Cl.
*F16L 3/22* (2006.01)

(52) U.S. Cl. .................. 248/68.1; 248/65; 248/71; 248/72; 248/74.1; 248/74.2; 248/63.1; 248/227.1; 248/227.3; 248/228.7; 248/228.8; 248/218.4; 52/731.9; 52/733.4; 52/736.3; 52/736.4; 174/48; 174/49; 174/40 R; 174/163 F; 174/163 R; 174/154; 174/155

(58) Field of Classification Search ............... 248/68.1, 248/71, 72, 227.1, 227.3, 228.7, 228.8, 218.4, 248/65, 74.1, 74.2, 63.1; 52/731.9, 733.4, 52/736.3, 736.4; 174/48, 49, 40 R, 163 F, 174/163 R, 154, 155, 175
See application file for complete search history.

(56) References Cited

U.S. PATENT DOCUMENTS

| | | | | | |
|---|---|---|---|---|---|
| 662,587 | A | * | 11/1900 | Blake | 174/159 |
| 1,772,687 | A | * | 8/1930 | Reinke | 174/48 |
| 2,109,213 | A | * | 2/1938 | Fearing | 403/283 |
| 2,492,044 | A | * | 12/1949 | Hulquist | 33/410 |
| 2,537,719 | A | * | 1/1951 | Tuepker | 174/45 R |
| 2,631,809 | A | * | 3/1953 | Jacobson | 248/317 |
| 3,036,801 | A | * | 5/1962 | Cemashko | 248/72 |
| 3,122,604 | A | * | 2/1964 | Cook et al. | 174/51 |
| 3,154,276 | A | * | 10/1964 | Havener | 248/73 |
| 3,191,281 | A | * | 6/1965 | Cobaugh | 29/752 |
| 3,313,009 | A | | 4/1967 | Beckerer | 248/74.2 |
| 3,363,864 | A | * | 1/1968 | Olgreen | 248/68.1 |
| 3,508,730 | A | * | 4/1970 | Knezo, Jr. | 248/73 |
| 3,528,636 | A | * | 9/1970 | Schmidt | 220/3.9 |
| 3,582,030 | A | | 6/1971 | Barrett | 248/68.1 |
| 3,724,795 | A | * | 4/1973 | Callanan | 248/682 |
| D227,745 | S | | 7/1973 | Kitson | D8/396 |
| D228,376 | S | | 9/1973 | Palatine | D8/373 |
| 3,778,537 | A | | 12/1973 | Miller | 174/138 R |
| 3,885,853 | A | * | 5/1975 | Reimer | 339/97 R |
| 4,259,767 | A | * | 4/1981 | Holton | 29/281.4 |
| 4,320,832 | A | | 3/1982 | Edstrom | 206/228 |
| D269,155 | S | | 5/1983 | Rose | D8/356 |
| D269,156 | S | | 5/1983 | Slinkard | D8/396 |

(Continued)

*Primary Examiner*—Carl D. Friedman
*Assistant Examiner*—Todd M. Epps
(74) *Attorney, Agent, or Firm*—Saliwanchik, Lloyd & Saliwanchik

(57) ABSTRACT

A wiring clip for securing electrical wiring to metal framing members. In a specific embodiment, the subject clip can secure the wiring a required distance from the nearest edge or face of the metal framing member to which a wall board is to be secured. The wire clip generally resembles an open frame having a wire receiving area formed in the main body, where the wire receiving area is centrally located within the main body. The wire clip is generally of U-shaped configuration, with two arms being joined to the main body. The end of the first arm is bent to form a J-hook, such that the J-hook can be hooked about a first inner edge of a metal stud. The end of the second arm comprises a clip, such that the clip can be removable, secured about the second inner edge of the metal stud. The arms, as well as the main body, are resilient, such that the arms and the main body will embrace the metal stud.

32 Claims, 1 Drawing Sheet

U.S. PATENT DOCUMENTS

| | | | |
|---|---|---|---|
| D273,841 S | 5/1984 | Chace | D8/394 |
| 4,538,782 A * | 9/1985 | Kirschenbaum | 248/68.1 |
| 4,635,886 A | 1/1987 | Santucci et al. | 248/73 |
| 4,807,417 A * | 2/1989 | Bell | 174/48 |
| 4,821,988 A | 4/1989 | Jimenez | 248/227.3 |
| 4,971,280 A * | 11/1990 | Rinderer | 248/228.7 |
| 5,067,677 A * | 11/1991 | Miceli | 248/68.1 |
| 5,079,802 A | 1/1992 | Blase et al. | 24/16 R |
| 5,127,577 A * | 7/1992 | Lynch et al. | 238/378 |
| 5,141,185 A * | 8/1992 | Rumbold et al. | 248/71 |
| D333,255 S * | 2/1993 | Newcomer et al. | D8/356 |
| D333,256 S * | 2/1993 | Newcomer et al. | D8/356 |
| D333,257 S * | 2/1993 | Newcomer et al. | D8/356 |
| 5,188,318 A * | 2/1993 | Newcomer et al. | 248/68.1 |
| D334,134 S * | 3/1993 | Newcomer et al. | D8/356 |
| D335,079 S | 4/1993 | Sachs | D8/369 |
| 5,277,006 A * | 1/1994 | Ruster | 52/220.7 |
| 5,423,501 A | 6/1995 | Yu | 248/61 |
| 5,463,189 A * | 10/1995 | Deneke et al. | 174/138 G |
| 5,533,696 A | 7/1996 | Laughlin et al. | 248/74.2 |
| 5,626,316 A | 5/1997 | Smigel et al. | 248/68.1 |
| 5,713,176 A * | 2/1998 | Hunt | 52/731.5 |
| 5,806,669 A | 9/1998 | Kim | 206/228 |
| 5,821,469 A * | 10/1998 | Shanmugham | 174/135 |
| 5,896,720 A | 4/1999 | Bond | 52/698 |
| D413,471 S * | 9/1999 | Romeo | D6/567 |
| 6,315,261 B1 * | 11/2001 | Snyder | 248/300 |
| D474,104 S * | 5/2003 | Spruill | D8/364 |

* cited by examiner

US 7,219,863 B1

WIRING CLIP SECURING ELECTRICAL WIRING TO A FRAMING MEMBER

FIELD OF THE INVENTION

The present invention relates generally to a wiring clip, and more particularly to a wiring clip for securing electrical wiring to a metal framing member.

BACKGROUND OF THE INVENTION

The National Electric Code specifies that electrical wiring be positioned a defined safe distance (1¼ inches) from the nearest edge of a framing member. The code requirement is found in Article 300, Section 300-4(d) N.E.C. If such spacing can not be maintained, the electrical wiring has to be protected by a $1/16$ inch thick steel plate or sleeve. The purpose of the code requirement is to prevent fasteners, intend to be driven into the face of the framing member to secure the wall board to the framing member, from piercing or otherwise damaging the electrical wiring.

A present practice is to staple electrical wiring to the major flat side of a wood framing member. While the method is suitable for single wires, this becomes a particular problem for multiple wires, where the wires should be stapled one on top of the other to maintain the proper distance from the nearest edge of the framing member. Additionally, with the increasing usage of metal studs as framing members, the stapling of the electrical wires to metal framing member is difficult and may not provide adequate support for the electrical wiring.

Therefore, a need exists in the industry for a wiring clip capable of securing one or more electrical wires to a metal framing member efficiently and effectively. It would be desirable for the wiring clip to be compact, lightweight, and easy to install.

BRIEF SUMMARY OF THE INVENTION

The present invention relates to a method and apparatus for securing electrical wiring to a metal framing member. A wire clip in accordance with the subject invention can have an open frame having a wire receiving area formed in the main body. The wire receiving area can be centrally located within the main body. The wire clip can be generally of U-shaped configuration, with two arms being joined to the main body. The end of the first arm can be bent to form a J-hook, such that the J-hook can be hooked about a first inner edge of a metal framing member. The end of the second arm can comprise a bent portion which can be secured about a second inner edge of the metal framing member. The arms, as well as the main body, can be flexible, such that the arms and the main body will embrace the metal framing member.

In a method of use, one or more electrical wires can be positioned with respect to the framing member prior to the installation of the wiring clip. The electrical wiring can then be secured in the proper longitudinal location on the metal stud by securing the J-hook of the subject wiring clip at the end of the first arm about the first inner edge of the metal framing member and moving the subject wiring clip over the metal framing member, positioning the electrical wiring within the wire receiving area. The wiring clip can then be secured to the metal framing member by slipping the end of the second arm around the second edge of the metal framing member.

In an alternative embodiment, a wiring clip in accordance with the subject invention can be secured to the metal framing member and then the electrical wire(s) can be positioned in the wire receiving area of the wiring clip. After the placement of the wire(s) in the receiving area, preferable the wire(s) are secured in place by a receiving area closure means.

An alternative method of securing electrical wiring to a framing member can involve the positioning of the subject wiring clip to the framing member and then threading the electrical wiring through the wire receiving area. The wire receiving area can have smooth edges so as to not cut the insulation on the electrical wiring.

The wiring clip can be further secured to the framing member by means of a secondary attachment device, such as a screw or other similar means. To secure, a screw can be driven through, for example, the first and/or second arm and into the metal stud.

DETAILED DISCLOSURE OF THE INVENTION

Figure 1:
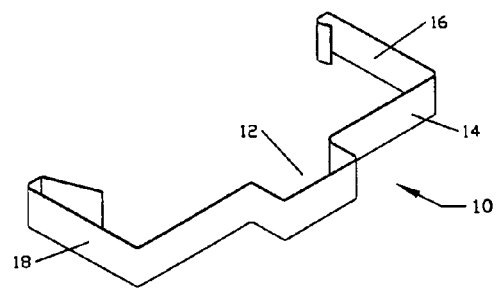
FIG. 1 is a perspective view of a wiring clip in accordance with the present invention.
Figure 2:
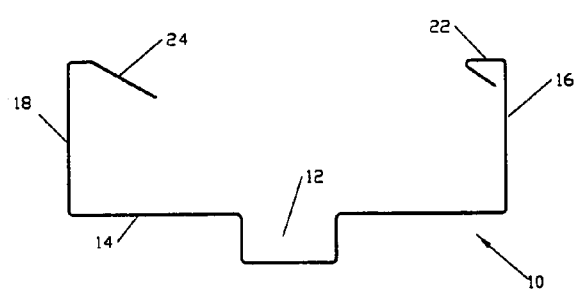
FIG. 2 is a top view of a wiring clip in accordance with the present invention.

Referring to FIGS. 1 and 2, an embodiment of the subject wiring clip 10 generally resembles an open frame having a wire receiving area 12 formed in the main body 14, where the wire receiving area 12 is centrally located within the main body 14. Although centrally locating wire receiving area 12 is preferred, a non-centrally located wire receiving area can also be utilized. The wire clip 10 shown in FIGS. 1 and 2 has a generally U-shaped configuration, with two arms 16 and 18 being joined to the main body 14. The end 20 of the first arm 16 is bent to form a J-hook 22, such that the J-hook 22 can be hooked about a first inner edge 42 of a metal framing member. The end 24 of the second arm 18 can be bent such that it can be slipped around a second inner edge 44 of the metal framing member. As such, end 24 can be removably secured about the second inner edge 44 of the metal framing member. The arms 16 and 18, as well as the main body 14, are preferably flexible, such that the arms 16 and 18 and the main body 14 can embrace the metal framing member. For example, the subject wiring clip 10 can be made of spring steel or other metals. Alternatively, the subject wiring clip 10 can be made from a flexible plastic or other appropriate material.

In a preferred embodiment, the wiring clip 10 is dimensioned to fit about a two-by-four metal framing member.

Figure 3:
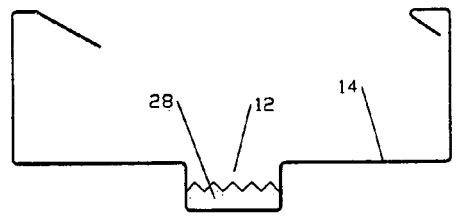
FIG. 3 is a top view of a specific embodiment of the present invention.

In an additional embodiment, as shown in FIG. 3, a material 28 can be affixed within the wire receiving area 12. Material 28 can be resilient such as to increase the compressive force between the wiring and the framing member, more securely securing the wiring against the metal framing member. For example, material 28 can be foam, rubber, or other similar materials. Material 28 can also be located along the sides of the wire receiving area to reduce the risk of cutting the wiring by the subject wiring clip.

Figure 5:
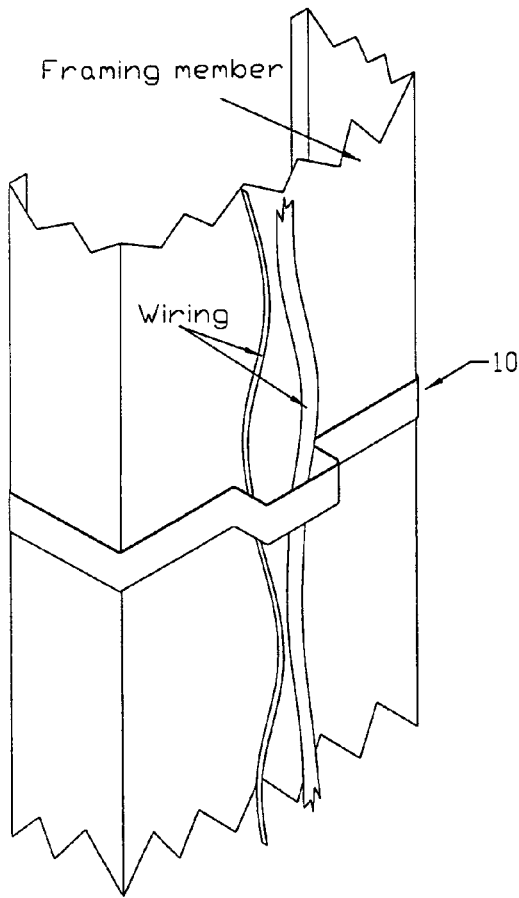
FIG. 5 is a top view of the clip end of the clip of the present invention being secured about a metal framing member.
Figure 4:
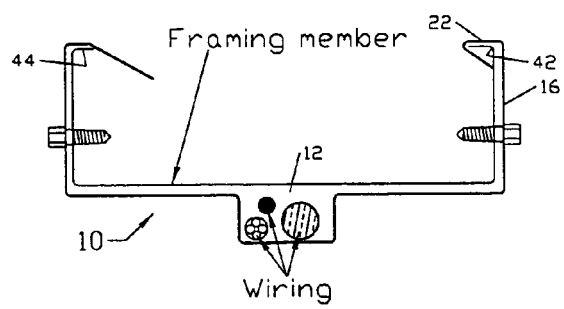
FIG. 4 is a top view of an embodiment of the subject invention securing wiring to a metal framing member, with screws securing the sides of the subject clip to the metal framing member.

In a preferred method of use, the wiring is positioned with respect to the framing member prior to securing the wiring clip 10 to the framing member. As shown in FIGS. 4 and 5, the wiring can then be secured in the proper location on the metal framing member 40 by securing the J-hook 22 at the end 20 of the first arm 16 about the first inner edge 42 of the metal framing member 40. The wiring clip 10 can then be positioned over the metal framing member 40 such that the electric wiring is within the wire receiving area 12. The wiring clip 10 can then be secured to the metal framing member 40 by clipping end 24 of the second arm 18 about the second inner edge 44 of the metal framing member 40. The end 24 permits the wiring clip 10 to be removably attached to the metal framing member 40, such that the wiring clip 10 can be temporarily removed from the metal framing member 40 to, for example, install additional wiring. If desired, the wiring clip 10 can be further secured by crimping the end 24 of the second arm 18 to match the contours of the second inner edge 44 of the metal framing member 40.

Preferably, sides 16 and 18 are thin enough so as to not impair proper placement of dry wall, or other covering material, onto the sides of the metal framing members. In addition, it is preferable that sides 16 and 18 allow drywall screws, or other covering fastening screws, to easily penetrate through sides 16 and 18 and into the side of the framing member 40. In a specific embodiment, as shown in FIG. 4, the wiring clip 10 can be further secured to the framing member 40 by means of a secondary attachment device, such as a screw 30 or other similar means. To secure, a screw 30 can be driven through, for example, the first arm 16 and/or the second arm 18 and into the metal framing member 40. Preferably, the protrusion of the secondary attachment device should be such as to not interfere with proper placement of dry wall, or other covering material, onto the sides of the metal framing members.

Figure 6:
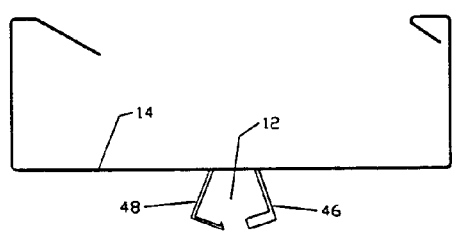
FIG. 6 is a top view of a specific embodiment of the present invention wherein the wire receiving area opens outward such that the wiring can be placed into the wire receiving area after the wiring clip is attached to the framing member.

Referring to FIG. 6, a specific embodiment of the subject wiring clip is shown wherein the wire receiving area opens outward such that the wiring can be placed into the wire receiving area after the wiring clip is attached to the framing member. Alternatively, in this embodiment the wiring can be secured in the wire receiving area prior to securing the wiring clip to the framing member. As shown in FIG. 6, once a wire is positioned in the wire receiving area 12, sides 46 and 48 can be pushed toward each other and snapped together so as to secure the wire within the wire receiving area. As needed, the snap mechanism 50 holding sides 46 and 48 together can be a one-time snap or can be an open-and-close snap. Also, other closure mechanisms can be used. For example, friction can be relied on to hold the wiring between sides 46 and 48. Preferably, the wiring clip of FIG. 6 can be made of a flexible plastic or other appropriate material.

It should be understood that the examples and embodiments described herein are for illustrative purposes only and that various modifications or changes in light thereof will be suggested to persons skilled in the art and are to be included within the spirit and purview of this application and the scope of the appended claims.

The invention claimed is:

1. A method for securing electrical wiring to an elongated metal framing stud member having a face and two sides with a wiring clip, wherein the wiring clip comprises:
   a main body being formed with a wire receiving area;
   a first arm, wherein said first arm is located at a first end of said main body, and said first arm comprises a first attachment means for attaching said first arm to a first side of a metal framing stud member having a face and two sides;
   a second arm, wherein said second arm is located at a second end of said main body and said second arm comprises a second attachment means for attaching said second arm to a second side of the metal framing stud member; and
   said wire receiving area being adjacent the main body, wherein the wire receiving area is located between the first arm and the second arm,
   the method for securing comprising the following steps:
      a) positioning the electrical wiring parallel to the length of the metal framing stud member;
      b) attaching said first arm to a first side of the metal framing stud member via said first attachment means for attaching said first arm to a first side of the metal framing stud member;
      c) moving the wiring clip over the metal framing stud member such that the electrical wiring is positioned within said wire receiving area;
      d) attaching said second arm to a second side of the metal framing stud member via said second attachment means for attaching said second arm to a second side of the metal framing stud member such that the wiring positioned within the wire receiving area is secured to the face of the metal framing stud member wherein the wiring positioned within the wire receiving area is centrally positioned on the face of the metal framing stud member between the first side of the metal framing stud member and the second side of the metal framing stud member and wherein the first arm and the second arm are in continuous contact with the first side and second side, respectively, of the metal framing stud member, wherein attaching said first arm to a first side of the metal framing stud member and attaching said second arm to a second side of the metal framing stud member brings the main body in contact with the face of the metal framing stud member.

2. The method for securing electrical wiring to a metal framing stud member having a face and two sides with a wiring clip according to claim 1, further comprising the step of securing the wiring clip to the metal framing stud member with a secondary attachment means for attaching the wiring clip to the metal framing stud member.

3. The method for securing electrical wiring to a metal framing stud member having a face and two sides with a wiring clip according to claim 2, wherein said secondary attachment means for attaching the wiring clip to the metal framing stud member is a screw, wherein said method comprises: attaching the wiring clip to the metal framing stud member with the screw.

4. The method for securing electrical wiring to a metal framing stud member having a face and two sides with a wiring clip according to claim 1, wherein said method is for securing electrical wiring to a two-by-four metal framing stud member having a face and two sides with a wiring clip.

5. The method according to claim 4, wherein the wiring positioned within the wire receiving area is secured to the face of the metal framing stud member so as to be located at least 1¼ inches from the first side of the metal framing stud member and located at least 1¼ inches from the second side of the metal framing stud member.

6. The method according to claim 1, wherein the wiring positioned within the wire receiving area is secured within the wire receiving area.

7. The method for securing electrical wiring to a metal framing stud member having a face and two sides with a wiring clip according to claim 1,
wherein the wiring clip comprises a wire compression member within said wire receiving area, wherein said method comprises compressing the wiring located within the wire receiving area against the metal framing stud member when the wiring clip is attached to the metal framing stud member.

8. The method according to claim 7, wherein the wire compression member is made of a substantially resilient material.

9. The method according to claim 8, wherein the wire compression member is made of a material selected from the group consisting of: foam material and rubber material.

10. The method according to claim 1, wherein the first attachment means is a J-hook, wherein said method comprises attaching the first arm to the first side of the metal framing stud member via the J-hook.

11. The method according to claim 10, wherein the second attachment means for attaching comprises a bend in the second arm which can be slipped around an inner edge of the second side of the metal framing stud member, wherein said method comprises slipping the bend in the second arm around the inner edge of the second side of the metal framing stud member.

12. The method according to claim 1, wherein the wiring clip is made of a flexible metal.

13. The method according to claim 1, wherein the wiring clip is made of a flexible plastic.

14. The method according to claim 1, wherein the first arm and the second arm are thin enough to not interfere with the attachment of a covering material to the metal framing stud member.

15. The method according to claim 1, wherein the first arm and the second arm allow fastening screws to penetrate through, wherein the method comprises securing the wiring clip to the metal framing stud member by penetrating fastening screws through at least one of the first arm and the second arm.

16. The method according to claim 1, wherein the main body contacts the face of the metal framing stud member such that the wire positioned within the wire receiving area is secured a distance from the first side of the metal framing stud member.

17. A method for securing electrical wiring to an elongated metal framing stud member having a face and two sides with a wiring clip, wherein the wiring clip comprises:
a main body being formed with a wire receiving area;
a first arm, wherein said first arm is located at a first end of said main body, and said first arm comprises a first attachment means for attaching said first arm to a first side of a metal framing stud member having a face and two sides;
a second arm, wherein said second arm is located at a second end of said main body and said second arm comprises a second attachment means for attaching said second arm to a second side of the metal framing stud member; and
said wire receiving area being adjacent the main body, wherein the wire receiving area is located between the first arm and the second arm,
the method for securing comprising the following steps:
a) positioning the electrical wiring along the metal framing stud member;
b) attaching said first arm to a first side of the metal framing stud member via said first attachment means for attaching said first arm to a first side of the metal framing stub member;
c) moving the wiring clip over the metal framing stud member such that the electrical wiring is positioned within said wire receiving area;
d) attaching said second arm to a second side of the metal framing stud member via said second attachment means for attaching said second arm to a second side of the metal framing stud member such that the wiring positioned within the wire receiving area is secured to the face of the metal framing stud member wherein the wiring positioned within the wire receiving area is centrally positioned on the face of the metal framing stud member between the first side of the metal framing stud member and the second side of the metal framing stud member and wherein the first arm and the second arm are in continuous contact with the first side and second side, respectively, of the metal framing stud member, wherein attaching said first arm to a first side of the metal framing stud member and attaching said second arm to a second side of the metal framing stud member brings the main body in contact with the face of the metal framing stud member.

18. A method for securing electrical wiring to an elongated metal framing stud member having a face and two sides with a wiring clip, wherein the wiring clip comprises:
a main body being formed with a U-shaped wire receiving area;
a first arm, wherein said first arm is located at a first end of said main body, and said first arm comprises a first attachment means for attaching said first arm to a first side of a metal framing stud member having a face and two sides;
a second arm, wherein said second arm is located at a second end of said main body and said second arm comprises a second attachment means for attaching said second arm to a second side of the metal framing stud member; and
said U-shaped wire receiving area adjacent the main body, wherein the wire receiving area is located between the first arm and the second arm,
the method for securing comprising the following steps:
a) positioning the electrical wiring parallel to the length of the metal framing stud member;
b) attaching said first arm to a first side of the metal framing stud member via said first attachment means for attaching said first arm to a first side of the metal framing stud member;
c) moving the wiring clip over the metal framing stud member such that the electrical wiring is positioned within said wire receiving area;
d) attaching said second arm to a second side of the metal framing stud member via said second attachment means for attaching said second arm to a second side of the metal framing stud member such that the wiring positioned within the wire receiving area is secured to the face of the metal framing stud member wherein the wiring positioned within the wire receiving area is centrally positioned on the face of the metal framing stud member between the first side of the metal framing stud member and the second side of the metal framing stud member and whereby the wiring clip is in continuous contact with the metal framing stud member except at the U-shaped wire receiving area, wherein attaching said first arm to a first side of the metal framing stud member and attaching said second arm to a second side of the metal framing stud member brings the main body to contact with the face of the metal framing stud member.

19. A method for securing electrical wiring to an elongated metal framing stud member having a face and two sides with a wiring clip, wherein the wiring clip comprises:
   a main body being formed with a U-shaped wire receiving area;
   a first arm, wherein said first arm is located at a first end of said main body, and said first arm comprises a first attachment means for attaching said first arm to a first side of a metal framing stud member having a face and two sides;
   a second arm, wherein said second arm is located at a second end of said main body and said second arm comprises a second attachment means for attaching said second arm to a second side of the metal framing stud member; and
   said U-shaped wire receiving area adjacent the main body, wherein the wire receiving area is located between the first arm and the second arm,
   the method for securing comprising the following steps:
   a) positioning the electrical wiring along the metal framing stud member;
   b) attaching said first arm to a first side of the metal framing stud member via said first attachment means for attaching said first arm to a first side of the metal framing stud member;
   c) moving the wiring clip over the metal framing stud member such that the electrical wiring is positioned within said wire receiving area;
   d) attaching said second arm to a second side of the metal framing stud member via said second attachment means for attaching said second arm to a second side of the metal framing stud member such that the wiring positioned within the wire receiving area is secured to the face of the metal framing stud member wherein the wiring positioned within the wire receiving area is centrally positioned on the face of the metal framing stud member between the first side of the metal framing stud member and the second side of the metal framing stud member and whereby the wiring clip is in continuous contact with the metal framing stud member except at the U-shaped wire receiving area, wherein attaching said first arm to a first side of the metal framing stud member and attaching said second arm to a second side of the metal framing stud member brings the main body in contact with the face of the metal framing stud member.

20. A wiring clip of securing wiring to a metal framing stud member having a face and two sides, comprising:
   a) a main body;
   b) a first arm located at a first end of said main body, wherein said first arm comprises a first attachment means for attaching said first arm to a first side of a metal framing stud member having a face and two sides;
   c) a second arm located at a second end of said main body, wherein said second arm comprises a second attachment means for attaching said second arm to a second side of the metal framing stud member; and
   d) a wire receiving area adjacent the main body, wherein the wire receiving area is located between the first arm and the second arm, wherein when said first arm and said second arm are attached to the first and second sides, respectively, of the metal framing stud member, wiring positioned within the wire receiving area is secured to the face of the metal framing stud member so as to be centrally positioned on the face of the metal framing stud member between the first side of the metal framing stud member and the second side of the metal framing stud member, wherein when said first arm and said second arm are attached to the first and second sides, respectively, of the metal framing stud member, the main body is in contact with the face of the metal framing stud member,
   wherein said wire receiving area comprises a means for closeably securing the wiring within the wire receiving area,
   wherein said means for closeably securing the wiring within the wire receiving area comprises a snap mechanism, wherein said snap mechanism opens and closes the wire receiving area.

21. The wiring clip according to claim 20, further comprising a wire compression member within said wire receiving area, wherein said wire compression member compresses electric wiring located within said wire receiving area against the metal framing stud member when said wiring clip is attached to the metal framing stud member.

22. The wiring clip according claim 21, wherein said wire compression member comprises a substantially resilient material.

23. The wiring clip according to claim 22, wherein said wire compression member is made of a material selected from the group consisting of: foam material and rubber material.

24. The wiring clip according to claim 20, wherein said first attachment means for attaching comprises a J-hook.

25. The wiring clip according to claim 24, wherein said second attachment means for attaching comprises a bend in the second arm which can be slipped around an inner edge of the second side of the metal framing stud member.

26. The wiring clip according to claim 20, wherein said wiring clip is made of a flexible metal.

27. The wiring clip according to claim 20, wherein said wiring clip is made of a flexible plastic.

28. The wiring clip according to claim 20, wherein said wiring clip is dimensioned to substantially fit about a two-by-four metal framing stub member.

29. The wiring clip according to claim 28, wherein the wiring positioned within the wire receiving area is secured to the face of the metal framing stud member so as to be located at least 1¼ inches from the first side of the metal framing stud member and located at least 1¼ inches from the second side of the metal framing stud member.

30. The wiring clip according to claim 20, wherein said first arm and said second arm are thin enough to not interfere with the attachment of a covering material to the metal framing stud member.

31. The wiring clip according to claim 20, wherein said first arm and said second arm allow covering fastening screws to penetrate through.

32. The wiring clip according to claim 20, wherein when said first arm and said second arm are attached to the first and second sides, respectively, of the metal framing stud member, the main body is in contact with the face of the metal framing stud member such that the wire positioned within the wire receiving area is secured a distance from the first side of the metal framing stud member.

* * * * *